US012283771B2

(12) United States Patent

Kuo

(10) Patent No.: US 12,283,771 B2
(45) Date of Patent: Apr. 22, 2025

(54) CONNECTOR PLUG, ABUTTING STRUCTURE OF THE SAME, AND ELECTRICAL CONNECTION MECHANISM HAVING THE SAME

(71) Applicant: GETAC TECHNOLOGY CORPORATION, New Taipei (TW)

(72) Inventor: Hsiu-Yu Kuo, Taipei (TW)

(73) Assignee: Getac Technology Corporation, New Taipei (TW)

( * ) Notice: Subject to any disclaimer, the term of this patent is extended or adjusted under 35 U.S.C. 154(b) by 394 days.

(21) Appl. No.: 17/874,168

(22) Filed: Jul. 26, 2022

(65) Prior Publication Data

US 2023/0030048 A1 Feb. 2, 2023

Related U.S. Application Data

(60) Provisional application No. 63/226,543, filed on Jul. 28, 2021.

(51) Int. Cl.

*H01R 13/627* (2006.01)
*H01R 13/502* (2006.01)
*H01R 13/506* (2006.01)

(52) U.S. Cl.

CPC ..... *H01R 13/6273* (2013.01); *H01R 13/5025* (2013.01); *H01R 13/506* (2013.01)

(58) Field of Classification Search

CPC ............ H01R 13/6273; H01R 13/5025; H01R 13/506; H01R 13/6272; H01R 13/6275
USPC .................................................. 439/589, 352
See application file for complete search history.

(56) References Cited

U.S. PATENT DOCUMENTS

| | | | | | |
|---|---|---|---|---|---|
| 4,872,736 | A | 10/1989 | Myers et al. | | |
| 4,880,393 | A * | 11/1989 | Moji | H01R 13/6273 | 439/352 |
| 7,175,465 | B1 * | 2/2007 | Tsai | H01R 13/6275 | 439/352 |
| 7,467,965 | B1 | 12/2008 | Arai | | |
| 7,577,936 | B2 | 8/2009 | Koseki et al. | | |
| 7,677,936 | B2 | 3/2010 | Sato et al. | | |
| 7,758,370 | B1 * | 7/2010 | Flaherty | H01R 13/6275 | 439/352 |
| 7,857,651 | B2 * | 12/2010 | Chen | H01R 13/6584 | 439/352 |
| 7,934,943 | B2 * | 5/2011 | Malstrom | H01R 13/562 | 439/447 |
| 8,087,954 | B2 * | 1/2012 | Fuchs | H01R 13/6275 | 439/352 |

(Continued)

*Primary Examiner* — Gary F Paumen
(74) *Attorney, Agent, or Firm* — Cooper Legal Group, LLC

(57) ABSTRACT

A connector plug, abutting structure of the same, and electrical connection mechanism having the same are provided. The connector plug includes a connection body and an outer casing member. The outer casing member is disposed outside the connection body and includes an inner casing, an outer casing movably fitted to the inner casing from outside, and a resilient component acting between the inner casing and the outer casing. At least one hook hole is disposed at the front end of the outer casing. At least one engaging arm is disposed on the inner casing and extends forward to form a hook portion. At least one engaging hole is disposed on a receptacle. When a plug is plugged into the receptacle, the hook portion becomes engaged with the engaging hole to achieve connection.

20 Claims, 5 Drawing Sheets

(56) References Cited

U.S. PATENT DOCUMENTS

| | | | | |
|---|---|---|---|---|
| 8,591,249 | B2 * | 11/2013 | Harnish .............. | H01R 13/562<br>439/447 |
| 8,807,489 | B2 | 8/2014 | Su et al. | |
| 8,876,543 | B2 | 11/2014 | Oka et al. | |
| 10,833,444 | B2 | 11/2020 | Maesoba et al. | |

* cited by examiner

CONNECTOR PLUG, ABUTTING STRUCTURE OF THE SAME, AND ELECTRICAL CONNECTION MECHANISM HAVING THE SAME

The application claims priority to U.S. Provisional Application No. 63/226,543, filed on Jul. 28, 2021, the disclosure of which is hereby incorporated by reference herein in its entirety.

BACKGROUND OF THE INVENTION

Field of the Invention

The present disclosure relates to connectors and, more particularly, to a connector plug, an abutting structure of a connector plug, and an electrical connection mechanism having a connector plug.

Description of the Prior Art

To prevent glitches, such as a loosened connector otherwise required for signal or data transmission, conventional industrial computers applicable to vehicles or operating in compliance with special standards or military standards, usually come with a specially-designed connector plugging structure, albeit limiting the scope of their application because of an eclectic mix of specifications.

Universal specification, such as USB Type-C specification, is conveniently available to conventional connectors but render it difficult to alter the plugging structures of the conventional connectors for use with the industrial computers in accordance with their stringent usage requirements. In view of this, the present disclosure provides an external reinforcement structure conducive to the application of connectors with universal specification to the aforesaid scenarios which have stringent usage requirements.

The present disclosure is further designed to ensure the abutting firmness of connectors.

SUMMARY OF THE INVENTION

It is an objective of the present disclosure to provide a connector plug, an abutting structure of a connector plug, and an electrical connection mechanism having a connector plug, all adapted to achieve structural reinforcement of connector casings while keeping their universal specification intact, and characterized by an engagement design whereby an abutting structure can be firmly fastened in place in the course of plugging, so as to prevent detachment of connectors in the course of male-female plugging.

Another objective of the present disclosure is to provide a connector plug, an abutting structure of a connector plug, and an electrical connection mechanism having a connector plug, which comply with universal specification, such as USB Type-C specification.

In order to achieve the above and other objectives, the present disclosure provides a connector plug, comprising: a connection body having a connector and a terminal member extended to a terminal end of the connector, wherein the terminal member comprises a cable electrically connected to the connector and a sheath portion enclosing the cable; and an outer casing member comprising an inner casing, an outer casing movably fitted to the inner casing from outside, and a resilient component acting between the inner casing and the outer casing, the inner casing fitting to the sheath portion from outside, wherein a circular sidewall at a front end of the outer casing defines an insertion port, and the connector protrudes from a front end of the sheath portion to thereby reach an interior of the insertion port, wherein at least one hook hole is disposed on the sidewall of the insertion port of the outer casing, whereas at least one engaging arm is disposed on the inner casing, extends forward and hangs over the sidewall of the insertion port to form a hook portion, the hook portion passing through the hook hole to thereby protrude out of the insertion port.

In order to achieve the above and other objectives, the present disclosure provides an abutting structure of a connector plug, comprising a plug and a receptacle. The plug comprises a connection body and an outer casing member disposed outside the connection body, wherein the outer casing member further comprises an inner casing, an outer casing movably fitted to the inner casing from outside, and a resilient component acting between the inner casing and the outer casing, wherein a circular sidewall at a front end of the outer casing defines an insertion port, and at least one hook hole is disposed on the sidewall of the insertion port of the outer casing, wherein at least one engaging arm is disposed on the inner casing, extends forward and hangs above the sidewall of the insertion port to form a hook portion, the hook portion passing through the hook hole to thereby protrude out of the insertion port. The receptacle comprises an abutting body and an abutting outer casing. The abutting outer casing has an insertion opening to be inserted by the sidewall of the outer casing, wherein the abutting body reaches an interior of the insertion opening, and the abutting outer casing has at least one engaging hole. The hook portion is engaged with the engaging hole when the connection body is inserted into the abutting body.

In order to achieve the above and other objectives, the present disclosure provides an electrical connection mechanism having a connector plug and comprising a cable and a plug. The plug is disposed at one end of the cable and comprises a connection body electrically connected to the cable and an outer casing member disposed outside the connection body, the outer casing member comprising an inner casing, an outer casing movably fitted to the inner casing from outside, and a resilient component acting between the inner casing and the outer casing, and a circular sidewall at a front end of the outer casing defines an insertion port. At least one hook hole is disposed on the sidewall of the insertion port of the outer casing, and at least one engaging arm is disposed on the inner casing, extends forward and hangs over the sidewall of the insertion port to form a hook portion. The hook portion passes through the hook hole to thereby protrude out of the insertion port.

DETAILED DESCRIPTION OF THE EMBODIMENTS

Technical features of the present disclosure are depicted by accompanying drawings and described below. However, the accompanying drawings are illustrative rather than restrictive of the present disclosure.

Figure 1:
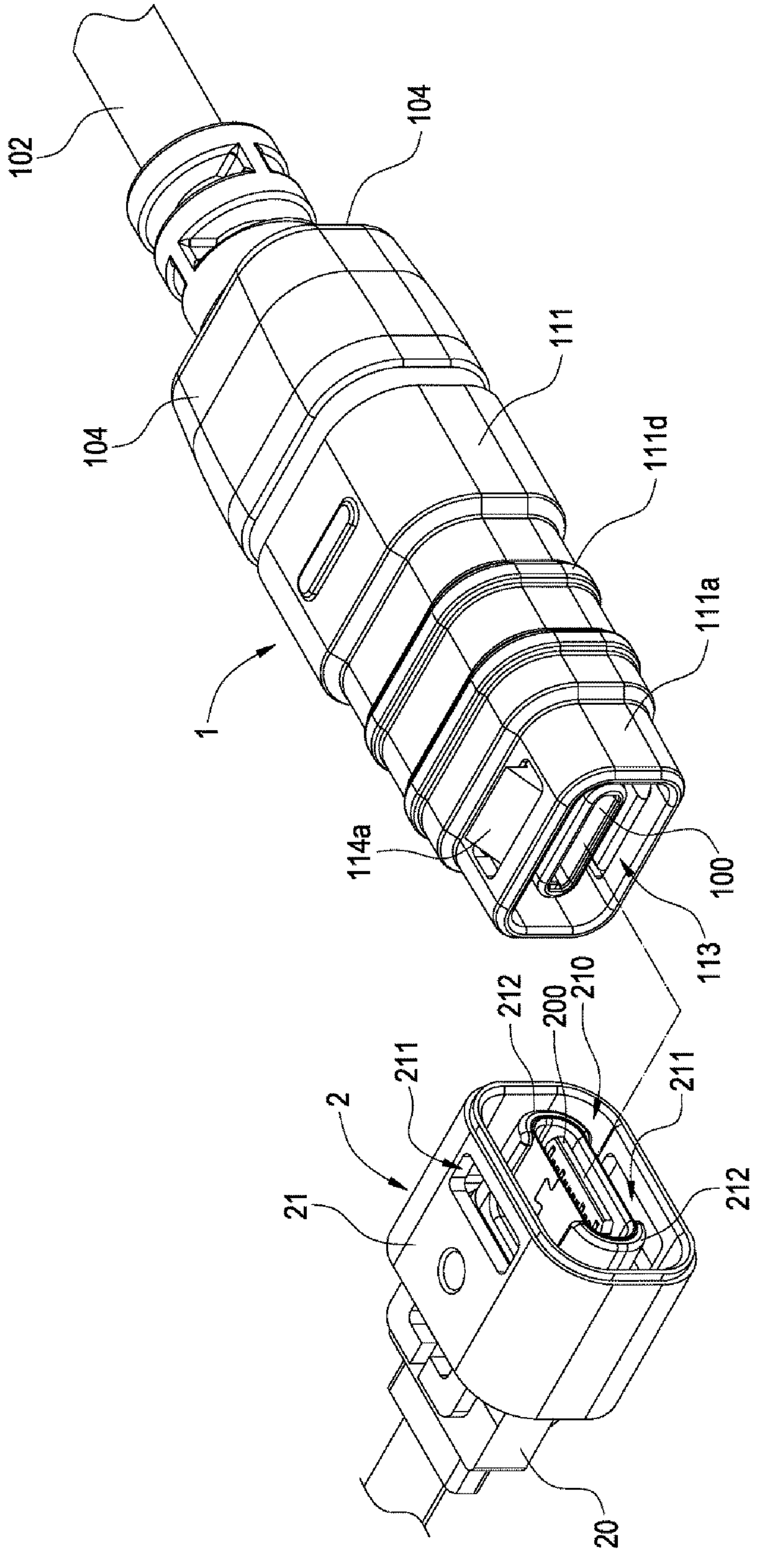
FIG. 1 is an exploded view of a plug and a receptacle of the present disclosure.
Figure 2:
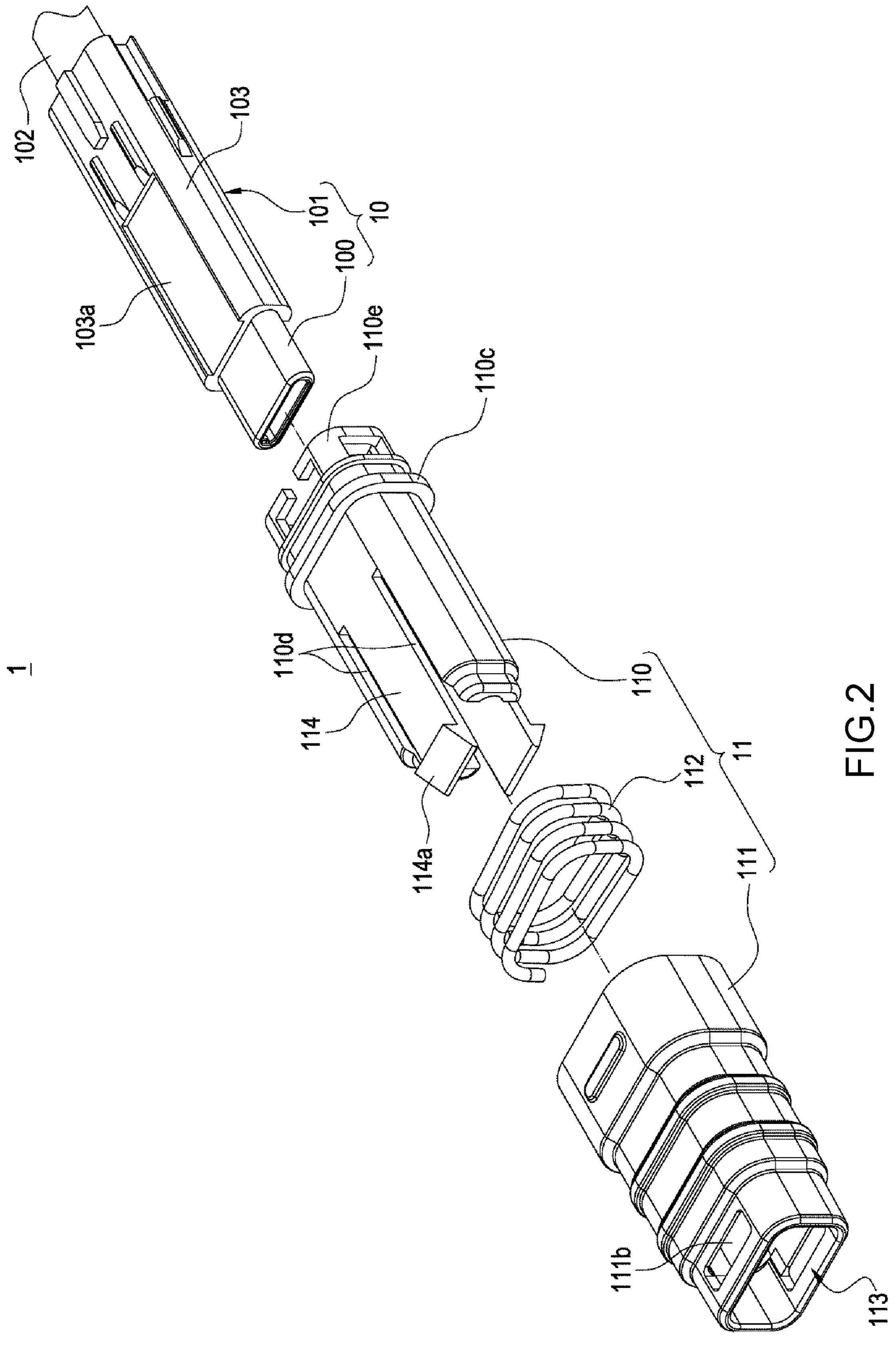
FIG. 2 is an exploded view of the plug of the present disclosure.

Referring to FIG. 1, there is shown an exploded view of a plug and a receptacle of the present disclosure. The present disclosure provides a connector plug, an abutting structure of the same, and an electrical connection mechanism having the same. A connector plug 1 is plugged into a receptacle 2. Referring to FIG. 2, the connector plug 1 comprises a connection body 10 and an outer casing member 11 disposed outside the connection body 10.

The connection body 10 has a connector 100 and a terminal member 101 extended to the terminal end of the connector 100. In an embodiment of the present disclosure, the connector 100 of the connector plug 1 is a connector with universal specification, such as USB Type-C specification, and is a female end of the specification. The terminal member 101 comprises a cable 102 electrically connected to the connector 100 of the connector plug 1 and a sheath portion 103 enclosing the cable 102. The electrical connection mechanism of the present disclosure is constructed by providing the connector plug 1 at one end of the cable 102, with the cable 102 electrically connected to the connection body 10. Depending on product needs, either connectors (not shown) with identical or different specifications are disposed at the other end of the cable 102, or the other end of the cable 102 is directly connected to a required apparatus (not shown).

Figure 4:
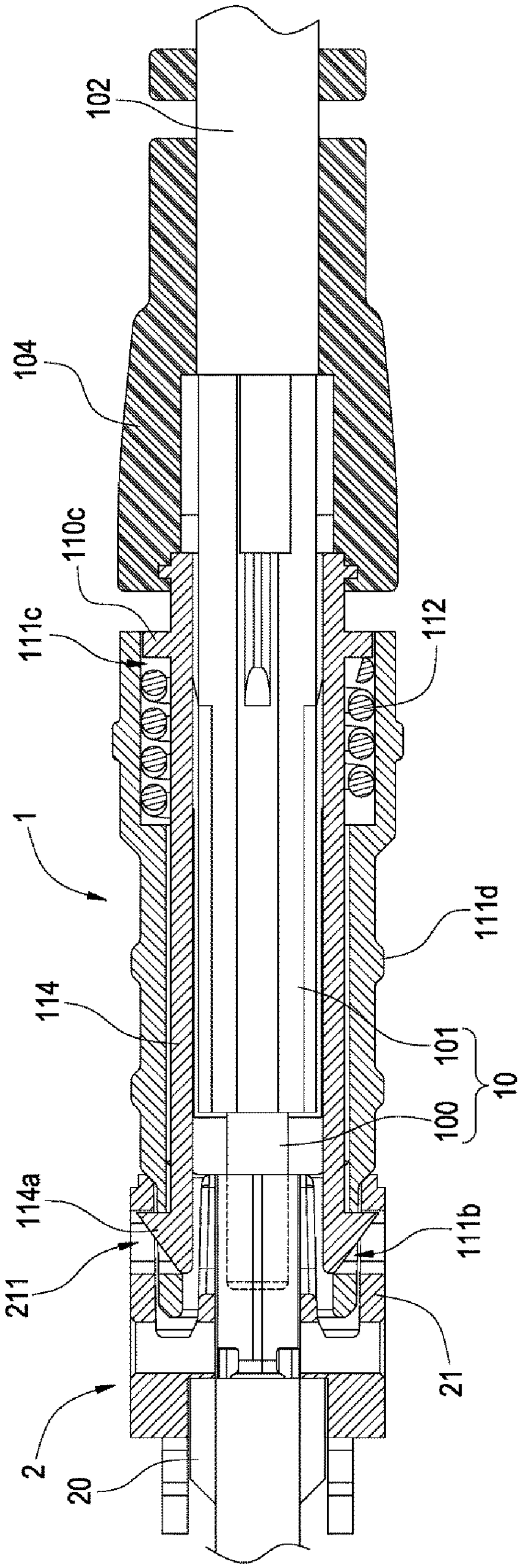
FIG. 4 is a cross-sectional view of the receptacle and the plug plugged thereinto according to the present disclosure.

The outer casing member 11 comprises an inner casing 110, an outer casing 111 movably fitted to the inner casing 110 from outside, and a resilient component 112 acting between the inner casing 110 and the outer casing 111. As shown in FIG. 4, in an embodiment of the present disclosure, the outer casing 111 expands to form a receiving region 111*c* which the resilient component 112 is inserted into and fitted to, whereas the inner casing 110 has a ring-shaped flange 110*c* and abuts against the rear end of the resilient component 112 so as for the resilient component 112 to be disposed between the inner casing 110 and the outer casing 111. The inner casing 110 fits to the sheath portion 103 of the connection body 10 from outside. The outer casing 111 has an insertion port 113. The insertion port 113 is an opening formed by a circular sidewall 111*a* of the outer casing 111. The connector 100 of the connector plug 1 protrudes from the front end of the sheath portion 103 to thereby reach the interior of the insertion port 113.

Figure 3:
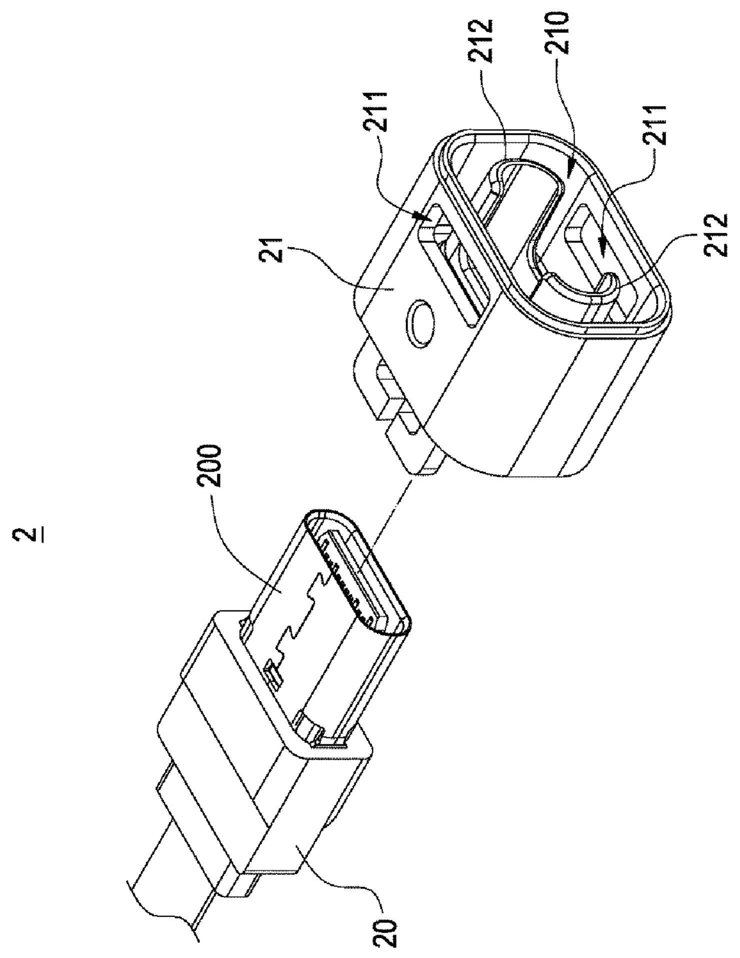
FIG. 3 is an exploded view of the receptacle of the present disclosure.

Referring to FIG. 1 and FIG. 3, the receptacle 2 comprises an abutting body 20 and an abutting outer casing 21. The abutting body 20 has a connector 200 with universal specification, such as Type-C specification or the like. The connector 200 enables the connector plug 1 to achieve electrical connection. The abutting outer casing 21 has an insertion opening 210. The abutting body 20 is adapted to enter the insertion opening 210 smoothly in a way facilitated by the outline of the anterior sidewall of the inner casing 110 of the connector plug 1, so as to achieve the electrical connection of the connector 200 of the receptacle 2 and the connector 100 of the connector plug 1.

As shown in FIG. 1 and FIG. 4, the present disclosure is advantageous in that at least one hook hole 111*b* is disposed on the sidewall 111*a* of the insertion port 113 of the outer casing 111 of the connector plug 1. The inner casing 110 has at least one engaging arm 114. The engaging arm 114 has therefrom a hook portion 114*a* protruding upward and hanging above the sidewall 111*a* of the insertion port 113. The hook portion 114*a* passes through the hook hole 111*b* and protrudes out of the insertion port 113. At least one engaging hole 211 is disposed on the abutting outer casing 21 of the receptacle 2 and corresponds in position to the hook portion 114*a* of the engaging arm 114; thus, the hook portion 114*a* becomes engaged with the engaging hole 211 as the connector 100 of the connector plug 1 is inserted into the connector 200 of the receptacle 2. As shown in FIG. 2, a groove 110*d* is disposed on the inner casing 110 and adapted to hang the engaging arm 114. The groove 110*d* is of a length which can be increased according to the position of the engaging arm 114 and can be designed according to the range of the swing carried out by the hook portion 114*a* and required for its separation from the engaging hole 211. As shown in FIG. 4, at least one channel 103*a* is disposed on the sheath portion 103 and corresponds in position to the engaging arm 114 from below, thereby increasing the room for the downward swing of the engaging arm 114. As shown in FIG. 3, two guide portions 212 are further disposed in the insertion opening 210 of the abutting outer casing 21 of the receptacle 2 and correspond in position to two sides of the connector 200 of the receptacle 2, respectively, to facilitate the alignment and guidance required for the insertion of the connector 100 of the connector plug 1.

Figure 5:
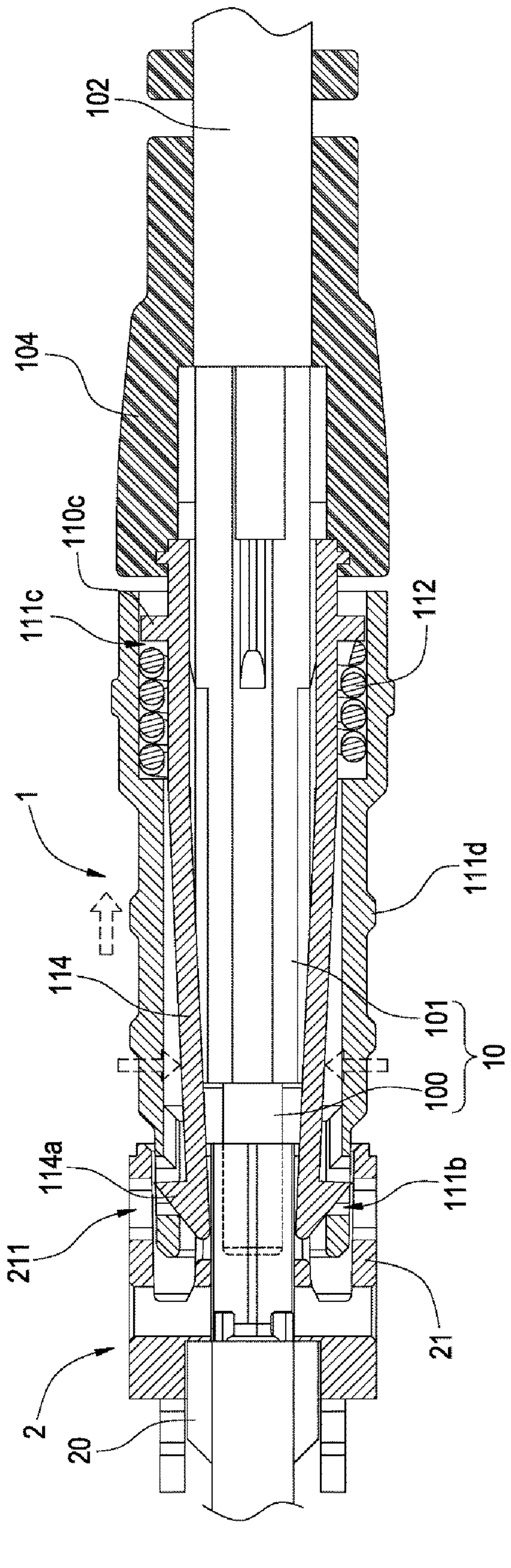
FIG. 5 is a cross-sectional view of the receptacle and plug separated from each other according to the present disclosure.

As shown in FIG. 5, to unplug the connector plug 1 from the receptacle 2, a user pushes the outer casing 111 rearward, for example, with a pull made by hand, and thus relative positions of the engaging hole 211 and the hook portion 114*a* vary. Thus, the outer casing 111 uses the sidewall 111*a* of the insertion port 113 to push the hook portion 114*a*, such that the engaging arm 114 swings downward to thereby enable separation of the hook portion 114*a* from the engaging hole 211, thereby unplugging the connector plug 1 from the receptacle 2. Furthermore, to render it easy to push the outer casing 111, its external surface has a plurality of flanges 111*d* which are easy to grip by hand. In addition, the number of the engaging arms 114 can be increased. As shown in FIG. 2, in an embodiment of the present disclosure, the engaging arms 114 are in the number of two and are disposed on two opposite sidewalls of the insertion port 113, respectively; and, as shown in FIG. 3, the engaging holes 211 are also in the number of two and are disposed at corresponding positions, respectively.

Referring to FIG. 2 and FIG. 4, in addition to its aforesaid technical features, the electrical connection mechanism of the present disclosure has advantageous technical features as follows: the cable 102 has a buffer structure 104 located at the terminal end of the outer casing member 11 of the connector plug 1; the buffer structure 104 is made by plastic injection molding and disposed between the cable 102 and the terminal end of the sheath portion 103; a link ring 110*e* is disposed at the terminal end of the inner casing 110; after the inner casing 110 and the outer casing 111 have been coupled together, the link ring 110*e* is coupled to the front edge of the buffer structure 104.

Therefore, given the aforesaid technical features, it is feasible to implement the connector plug, abutting structure of the same, and electrical connection mechanism having the same according to the present disclosure.

In conclusion, the present disclosure achieves anticipated objectives of use and overcomes drawbacks of prior art. Furthermore, the present disclosure has novelty and inventiveness and thus meets patentability requirements. Therefore, a patent application is filed according to the Patent Act, and granting the application with patent rights is respectfully requested to ensure rights of the Inventor.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent changes made to the aforesaid embodiments shall fall within the scope of the present disclosure. Accordingly, the legal protection for the present disclosure shall be defined by the appended claims.

What is claimed is:

1. An abutting structure of a connector plug, comprising:
a plug comprising a connection body and an outer casing member disposed outside the connection body, wherein:
the outer casing member comprises an inner casing, an outer casing movably fitted to the inner casing to surround the inner casing, and a resilient component acting between the inner casing and the outer casing,
a circular sidewall at a front end of the outer casing defines an insertion port,
at least one hook hole is disposed on the circular sidewall of the insertion port of the outer casing,
at least one engaging arm is disposed on the inner casing,
the at least one engaging arm extends forward and hangs above the circular sidewall of the insertion port to form a hook portion, and
the hook portion passes through the at least one hook hole to thereby protrude out of the insertion port; and
a receptacle comprising an abutting body and an abutting outer casing, wherein:
the abutting outer casing has an insertion opening to be inserted by the circular sidewall of the outer casing,
the abutting body reaches an interior of the insertion opening,
the abutting outer casing has at least one engaging hole,
the hook portion is engaged with the at least one engaging hole when the connection body is inserted into the abutting body,
two guide portions are disposed in the insertion opening of the abutting outer casing and correspond in position to two sides of a connector of the plug, respectively, and
the insertion opening is defined between an inner wall of the abutting outer casing and an outer wall of the two guide portions.

2. The abutting structure of claim 1, wherein;
the receptacle has a connector, and
the connector of the plug and the connector of the receptacle comply with Type-C specification.

3. The abutting structure of claim 1, wherein the at least one engaging hole extends through the abutting outer casing from the inner wall of the abutting outer casing to an outer wall of the abutting outer casing.

4. The abutting structure of claim 1, wherein:
the connection body has a terminal member extended to a terminal end of the connector, and
the terminal member comprises a cable electrically connected to the connector and a sheath portion enclosing the cable.

5. The abutting structure of claim 4, wherein:
the inner casing fits to the sheath portion to surround the sheath portion, and
the connector protrudes from a front end of the sheath portion to thereby reach an interior of the insertion port.

6. The abutting structure of claim 4, wherein at least one channel is disposed on the sheath portion and corresponds in position to the at least one engaging arm.

7. The abutting structure of claim 1, wherein the connector complies with Type-C specification.

8. The abutting structure of claim 1, wherein:
the outer casing expands to form a receiving region which the resilient component is inserted into and fitted to, and
the inner casing has a ring-shaped flange and abuts against a rear end of the resilient component.

9. The abutting structure of claim 1, wherein:
the at least one engaging arm is two engaging arms, and
the two engaging arms are disposed on two opposite sides of the inner casing, respectively.

10. The abutting structure of claim 1, wherein the inner casing has a groove adjacent the at least one engaging arm.

11. The abutting structure of claim 1, wherein:
the connection body comprises a cable, and
the cable has a buffer structure disposed at a terminal end of the outer casing member.

12. The abutting structure of claim 1, wherein:
the connection body comprises a cable,
the cable has a buffer structure, and
a space is defined between the outer casing and the buffer structure to enable the outer casing to move toward the buffer structure when disconnecting the connector plug from the receptacle.

13. An abutting structure of a connector plug, comprising:
a plug comprising a connection body and an outer casing member disposed outside the connection body, wherein:
the outer casing member comprises an inner casing, an outer casing movably fitted to the inner casing to surround the inner casing, and a resilient component acting between the inner casing and the outer casing,
a circular sidewall at a front end of the outer casing defines an insertion port,
at least one hook hole is disposed on the circular sidewall of the insertion port of the outer casing,
at least one engaging arm is disposed on the inner casing,
the at least one engaging arm extends forward and hangs above the circular sidewall of the insertion port to form a hook portion, and
the hook portion passes through the at least one hook hole to thereby protrude out of the insertion port; and
a receptacle comprising an abutting body and an abutting outer casing, wherein:
the abutting outer casing has an insertion opening to be inserted by the circular sidewall of the outer casing,
the abutting body reaches an interior of the insertion opening,
the abutting outer casing has at least one engaging hole,
the hook portion is engaged with the at least one engaging hole when the connection body is inserted into the abutting body, and
the at least one engaging hole extends through the abutting outer casing from an inner wall of the abutting outer casing to an outer wall of the abutting outer casing.

14. The abutting structure of claim 13, wherein the plug and the receptacle each have a connector with Type-C specification.

15. The abutting structure of claim 13, wherein two guide portions are disposed in the insertion opening of the abutting outer casing and correspond in position to two sides of a connector of the plug, respectively.

16. The abutting structure of claim 13, wherein:
the connection body has a connector and a terminal member extended to a terminal end of the connector, and the terminal member comprises a cable electrically connected to the connector and a sheath portion enclosing the cable.

17. The abutting structure of claim 16, wherein:

the inner casing fits to the sheath portion to surround the sheath portion, and the connector protrudes from a front end of the sheath portion to thereby reach an interior of the insertion port.

18. The abutting structure of claim 16, wherein the connector complies with Type-C specification.

19. The abutting structure of claim 16, wherein at least one channel is disposed on the sheath portion and corresponds in position to the at least one engaging arm.

20. The abutting structure of claim 13, wherein:

the outer casing expands to form a receiving region which the resilient component is inserted into and fitted to, and the inner casing has a ring-shaped flange and abuts against a rear end of the resilient component.

* * * * *